June 23, 1953 W. E. PACE 2,642,780
APPARATUS FOR CUTTING GEARS AND THE LIKE
Filed July 24, 1947 4 Sheets-Sheet 1
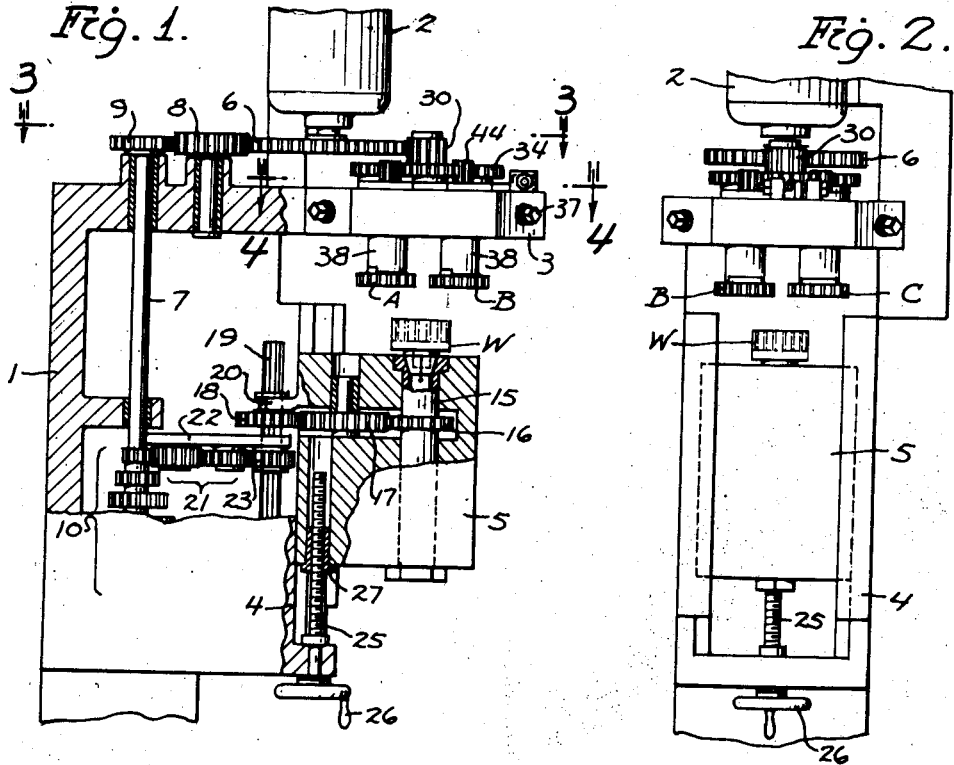
Fig. 1.
Fig. 2.
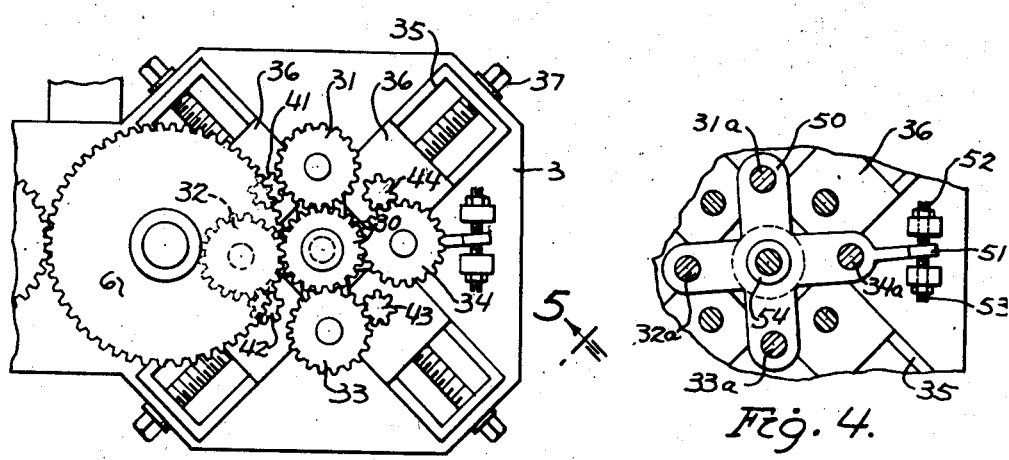
Fig. 3.
Fig. 4.
INVENTOR.
Waldemar E. Pace
BY
Barnes, Kisselle, Laughlin & Raisch
ATTORNEYS.

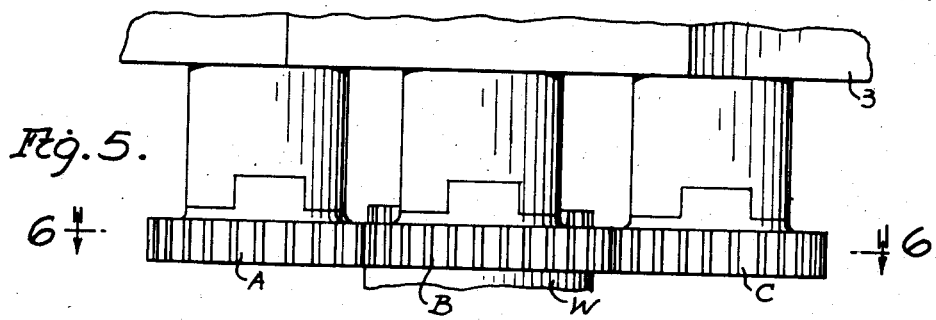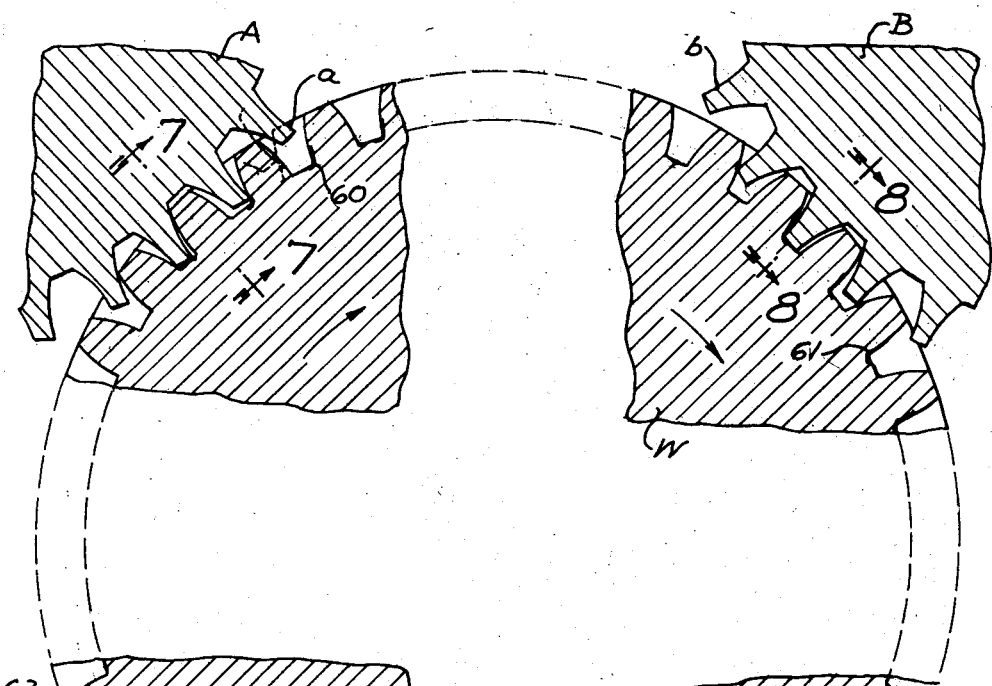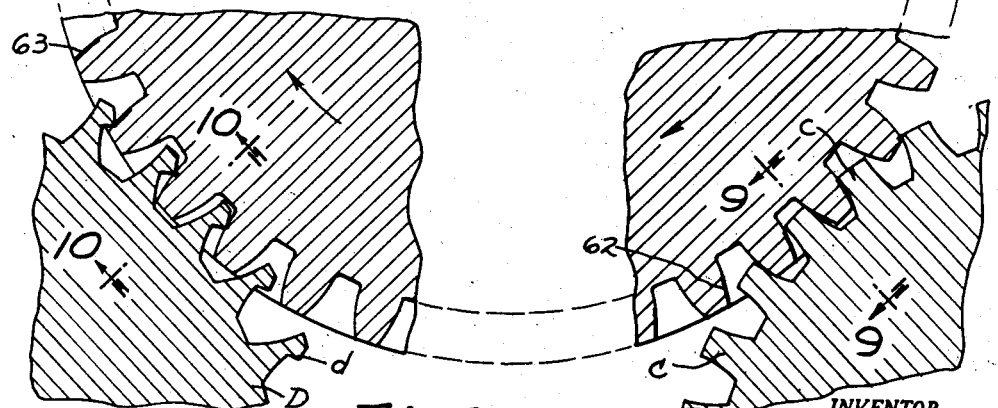

June 23, 1953 W. E. PACE 2,642,780
APPARATUS FOR CUTTING GEARS AND THE LIKE
Filed July 24, 1947 4 Sheets-Sheet 3

INVENTOR.
Waldemar E. Pace
BY
*Garner Kisselle Laughlin & Rauch*
ATTORNEYS.

June 23, 1953  W. E. PACE  2,642,780
APPARATUS FOR CUTTING GEARS AND THE LIKE
Filed July 24, 1947  4 Sheets-Sheet 4

INVENTOR.
Waldemar E. Pace
BY
Barnes, Kisselle, Laughlin & Raisch
ATTORNEYS.

Patented June 23, 1953

2,642,780

UNITED STATES PATENT OFFICE 2,642,780

APPARATUS FOR CUTTING GEARS AND THE LIKE

Waldemar E. Pace, Detroit, Mich.

Application July 24, 1947, Serial No. 763,379

3 Claims. (Cl. 90—3)

This invention relates to apparatus for cutting gears or similar toothed elements, such as a splined shaft, and more particularly it has to do with the cutting of blank work pieces to form the teeth of the gear or splined formation.

An object of the invention is to provide apparatus for so cutting the work piece that the toothed formation may end abruptly at a shoulder or at the intersection with a toothed formation extending at a different angle from those being cut. For the purpose of further description and disclosure of the invention, reference will be made specifically to gears and gear cutters, although it will be understood that similar devices, which specifically may not be termed gears, may be formed by the method and apparatus of the present invention.

In carrying out the invention, the work piece is related to a head or carrier which supports one or more cutter wheels having cutter teeth. The cutter wheels are rotated on their own axes. Relative rotation is set up between the carrier or head and the work piece. This may be done by rotating either the head which supports the cutter wheels or rotating the work piece on its own axis as shown herein. The cutter or cutters are rotated on their own axes in unison with the relative rotation of the work piece. In the early stages of the operation, the cutter or cutters engage an end face of the work and remove material therefrom and the tooth formation is formed or generated as the feeding movement continues with the gear formation progressing in an axial direction relative to the work piece. The cutter or cutters thus remain in contact with the work piece throughout the operation thus saving time and eliminating indexing. A gear with an extremely accurate pitch circle can thus be formed and in the cutting of the teeth, the cutter or cutters may first perform a cut on one side of the tooth and then form a cut on the opposite side of the tooth. Once the cutting operation is commenced, it is continuous until the teeth are cut to the desired axial extent, whether this be entirely across the work piece or whether the cut is made up to a determined location on the work piece, thus leaving an integral shoulder.

Other objects will become apparent as the detailed description continues. An apparatus for carrying out the invention is disclosed in the accompanying drawings:

Fig. 1 is a general view largely in cross section showing an apparatus for cutting a tooth on a gear.

Fig. 2 is a view at right angles to Fig. 1 showing the slidable mounting for the feeding movement of work piece.

Fig. 3 is a cross sectional view taken substantially on line 3—3 of Fig. 1 showing certain driving elements.

Fig. 4 is a cross sectional view taken substantially on line 4—4 of Fig. 1 showing an adjusting arrangement.

Fig. 5 is an enlarged view looking substantially on line 5—5 of Fig. 3 showing some of the cutters.

Fig. 6 is an enlarged broken view showing a series of cutters operating on a work piece in the form of a gear.

Figure 7:
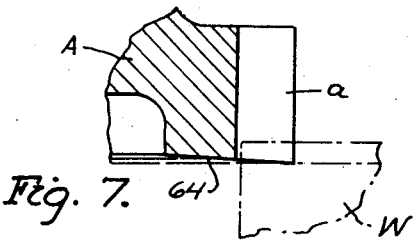
Fig. 7 is a view taken on line 7—7 of Fig. 6 showing the work piece in broken lines and illustrating formation of the cutter teeth on one cutter.

As shown in Figs. 1 and 2, the apparatus may include a suitable support or frame structure 1 and a driving motor 2. The frame has a cutter supporting portion or head 3 and is provided with ways 4 for a slidable work carrier 5.

A main driving gear, which is operated by the motor, drives a shaft 7 through the means of intermeshing gears 8 and 9 and the shaft 7 has a cluster of gears of different size, as generally illustrated at 10. The slide 5 carries a shaft 15 upon which the work piece W is to be mounted so that it can be rotated. The shaft 15 is driven through intermeshing gears 16 and 17 and a gear 18 slidably mounted on a splined shaft 19. The gear 19 is movable with the slide 5 by means of a yoke 20. The shaft 19 is driven through the means of a gear set 21 mounted on a carrier 22 one of which meshes with a gear 23. The gear sets 10 and 21 constitute, in effect, a variable speed transmission in that by manipulation of the carrier 22, the gear set 21 may be shifted to operate off of any one of the gears in the cluster 10. In making the shift, the gear 23 slides on the shaft 19. Any suitable means is provided for feeding the work to the cutters and a simple means is shown in the form of a screw 25 which may be operated by a hand crank 26, the screw operating in a nut 27 carried by the slide.

As above mentioned, the head 3 carries the cutters and in the form shown in Figs. 1 to 4 inclusive, there are four cutters all driven by the motor in proper unison with the rotation of the work piece. The gear 6 drives a central gear 30 which, in turn, drives four idler gears 31, 32, 33 and 34. The head 3 is provided with four slide ways, each represented at 35, and in each slide way is a slidable carrier 36, each operable by a screw 37. Each carrier 36 has a projecting rotary element or shaft 38 and each shaft is provided with a gear. These gears are separately numbered, as shown at 41, 42, 43 and 44, and they mesh respectively with the gears 31, 32, 33 and 34. The four projecting shafts 38 carry the cutters indicated at A, B, C, and D (Fig. 6).

It will be observed from this arrangement that the cutters may be adjusted positioned at different distances from the central axis of the driving gear 30. Where the work W and its shaft 15 are on this same axis, the cutters may be adjusted to different positions radially with respect to the axis of the work. This is done by manipulating the screws 7 to shift the shafts 38 and their cutters and the gears 41, 42, 43 and 44 radially. Of course, when this is done, the meshing of the teeth of the gears must be corrected. To this end, the several gears 31, 32, 33 and 34 are mounted on shafts 31a, 32a, 33a and 34a, which are carried by a four-armed bracket 50 (Fig. 4). This bracket 50 has an arm 51 located between opposed adjusting screws 52 and 53 so that the bracket can be rotatably adjusted about its central mounting 54. If, for example, the slide 36 of the gear 44 be adjusted radially outwardly as Fig. 3 is viewed, then the bracket 50 may be rotatably adjusted in a counterclockwise direction, to bring the teeth of gear 34 into proper mesh with those of gear 44. The same adjustment takes care of the meshing of the teeth of gears 31, 32, and 33 with respect to their mating gears 41, 42 and 43. If the cutters are to be adjusted radially inwardly, the operation is just the reverse.

Considering Fig. 6, the operation and the manner of cut will be observed. First, bear in mind that the rotation of the cutters and the relative rotation between the work piece and the head 3 is in unison. Specifically, in the mechanism shown, the cutters rotate in unison with the work piece.

Figure 8:
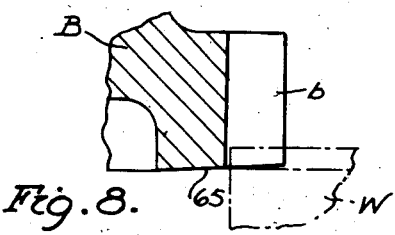
Fig. 8 is a view similar to Fig. 7 taken on section line 8—8 of Fig. 6 and illustrating the cutter teeth on another cutter.
Figure 9:
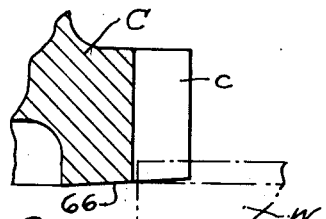
Fig. 9 is a view similar to Figs. 7 and 8 taken on line 9—9 of Fig. 6 and illustrating the cutter teeth on still another cutter.
Figure 10:
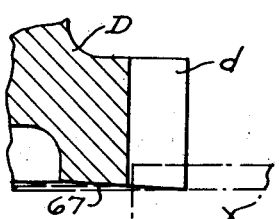
Fig. 10 is a view similar to Figs. 7, 8, and 9 taken on line 10—10 of Fig. 6 showing cutter teeth on a fourth cutter.

Moreover, the number of teeth on the work piece and the number of teeth on the cutters must either be equal or in multiples. With the work piece rotating clockwise, as Fig. 6 is viewed, then the cutters operate counter-clockwise. The relative movement produced by the feeding action brings the work up to the cutters so that the cutting teeth engage the end of the work piece and as the work piece advances the cutters cut from the end of the work piece some of the metal. The depth of the cut is variable depending upon what is desired and depending upon the material of the work piece. The teeth on the cutter A may be shaped substantially as shown in Fig. 6 with a cutting portion $a$ which engages the work and performs a cut on the work piece as it is moving out of engagement with the work, as indicated by the darkened line 60. In other words, cutter A cuts the dedendum on the trailing face of a tooth. The teeth on cutter B have cutting edges $b$ which cuts the leading dedendum of a tooth as it is moving into engagement with the blank as indicated by the darkened line 61 (Fig. 6). The teeth of cutter C have cutting portions $c$ which cuts the addendum of the trailing face of the tooth as it is moving into engagement with the blank, as indicated by the darkened lines 62 (Fig. 6). The teeth of cutter D are specially formed with undercut or hook-like cutter portions $d$ and these cut the leading addendum of the teeth as it is moving out of engagement with the blank, as illustrated by the darkened lines 63 (Fig. 6). Thus, it will be seen that in one full revolution of the work piece, each tooth to be formed has the several cuts performed thereon with cutters A and B cutting the metal for the dedendum of each tooth and with cutters C and D cutting the addendum of each tooth. It might be said again that as the work first engages the teeth the several cuts are made on the end of the work and then as the work continues to advance, the cutting continues axially of the work piece so that the teeth are, in effect, formed or grow in an axial direction. As shown in Fig. 7, the teeth $a$ and the adjacent portion of the cutter wheel A are angularly formed as at 64 to provide for the escape of chips cut from the work piece. As shown in Fig. 8, the cutter B and its teeth $b$ are angularly formed as shown at 65 to provide for the escape of chips, but in this case the angular relief is in the opposite direction. As shown in Fig. 9, the teeth and adjacent portion of the cutter C are relieved as at 66 for providing escape of chips, and as shown in Fig. 10, the cutter D and its teeth $d$ are relieved as at 67 for the escape of chips. The cutter teeth $a$ and $b$ thus cut the work to provide the requisite space or clearance between the teeth and particularly the space from the root diameter through the base circle and up to about the pitch diameter. The teeth illustrated on the work W may be involute teeth, as indicated. The cutters $c$ and $d$ finish the involute and perform cuts from the vicinity of the pitch diameter to the top of the tooth.

A sample of a gear which may be cut is shown in Fig. 10. This gear, generally indicated at 68, is a single piece of metal with gear teeth 69 cut thereon. The spaces or clearance between the teeth are indicated at 70 and the integral collar or shoulder is at 71. The spaces 70 meet the abrupt wall or face 72 at the shoulder.

Figure 11:
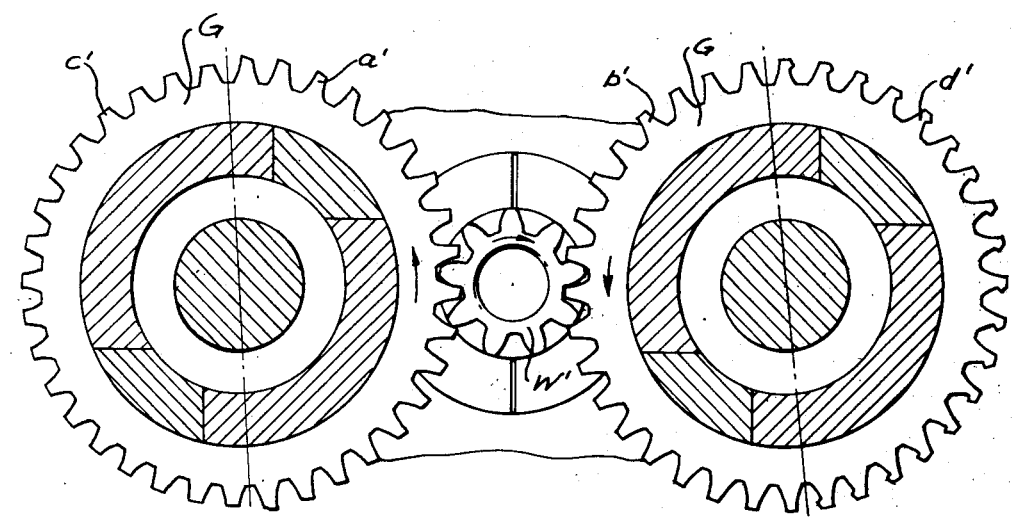
Fig. 11 is an enlarged view showing cutters forming a gear with standard teeth.

Of course, where a small gear is to be cut, it may be impossible to group four cutters around the gear. This is illustrated in Fig. 11, where a small work piece W' is being formed. In this case, two cutter wheels are employed and each cutter wheel has two types of cutter teeth thereon. One cutter wheel, as shown at G, has a series of cutter teeth $a'$ which corresponds to and take the same cut as the teeth $a$. The second cutter wheel H has a series of teeth $b'$ which correspond to and take the same type of cut as the teeth b. The cutter wheel G has a second series of teeth c' which correspond to and take the same type of cut as the teeth c, while the cutter wheel H has a series of teeth d' which correspond to and take the same type of cut as the teeth d. This view also demonstrates meticulously what is means when it was said that the teeth on the work piece and the teeth on the cutters have to be of the same number or in multiples thereof. In the specific example, as shown in Fig. 11, the work piece W' has nine teeth, while there are eighteen cutter teeth in each group on the two cutters.

Figure 12:
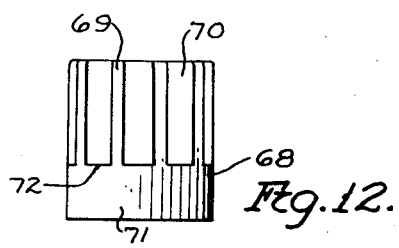
Fig. 12 is a plan view of a gear which may be formed.

The work piece W', which may also be exemplary of the workpiece 68, as shown in Fig. 12, wherein the teeth 69 with spaces 70 therebetween are cut squarely up to the shoulder 71 with a squarely formed face 72 at the ends of the spaces 70, which is abrupt and may be substantially at right angles to the axis of the work piece.

Figure 13:
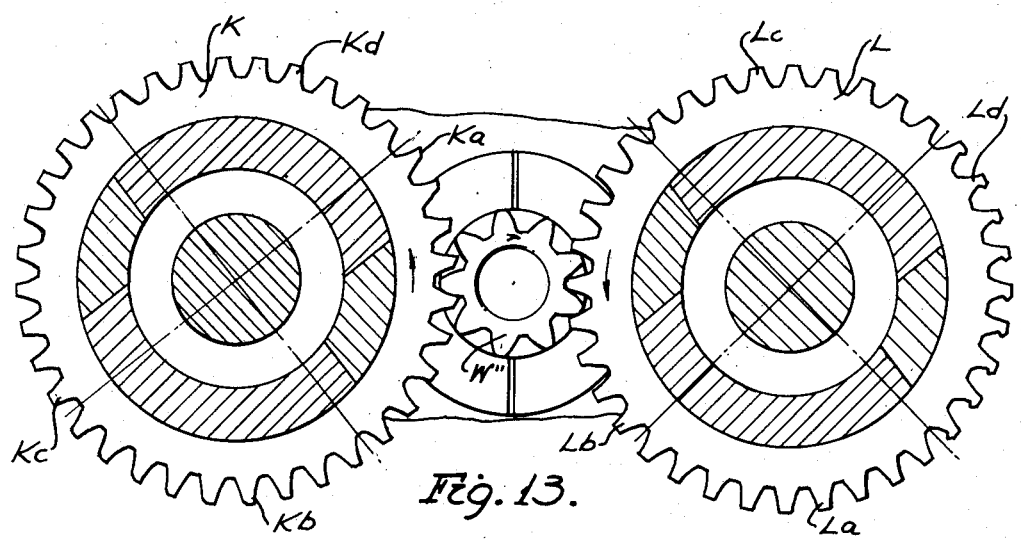
Fig. 13 is a view similar to Fig. 11 showing cutters forming a gear with stub teeth and also showing a different arrangement of cutter teeth.
Figure 14:
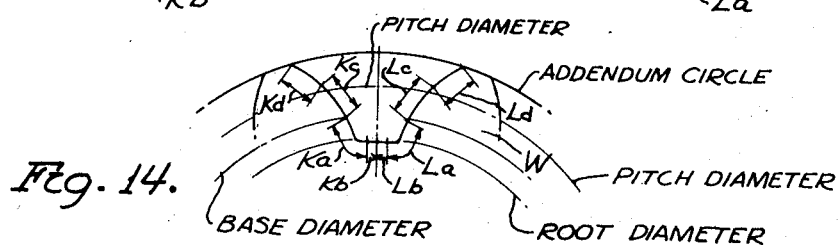
Fig. 14 is a diagrammatic illustration showing the locations where cuts are made by the cutting teeth of the cutter shown in Fig. 13.

A slightly different situation prevails where stub teeth are formed on the small gear as shown in Fig. 13. The work piece is illustrated at W'' and two cutter wheels are shown. Each cutter, however, has four sets of teeth. The cutter gear K has a set of teeth Ka, a second set of teeth Kb, a third set of teeth Kc and a fourth set of teeth Kd, symmetrically arranged in the four segments of the gear. The cutter L has a set of teeth La, a set of teeth Lb, a set of teeth Lc and a set of teeth Ld, symmetrically arranged in the four segments of the cutter. In the operation of the arrangement, the series of cutters successively operate on the work in the locations illustrated diagrammatically in Fig. 14. Assume that the work piece W'' is rotating clockwise and that the cutters are rotating counter-clockwise. A sequence of the cuts is as follows: The teeth Ka perform a cutting operation at the dedendum and the leading edge of a tooth, as shown by the line Ka in Fig. 14. The teeth La of cutter L cut the dedendum of the trailing edge of a tooth as shown by the line La. The teeth Kb and the teeth Lb perform cuts at the root diameter and thus clear the space between teeth. The teeth Kc take cuts on the leading edge of a tooth substantially at the base circle of the tooth while the teeth Lc perform a cut on the trailing face of the tooth substantially at the base circle of the tooth. The teeth Kd perform cuts on the leading face of the tooth and on the addendum thereof with the cut extending from the vicinity of the pitch diameter to the crown of the tooth. The teeth Ld take cuts on the trailing edge of the tooth substantially from the pitch diameter to the crown of the tooth.

Thus, it will be noted that the teeth Ka and La perform cuts in the dedendum region while cutter teeth Kb and Lb cut out the space to provide the clearance at the root diameter. The cutters Kc and Lc perform cutting operations in the intermediate section of the teeth in the vicinity of the pitch diameter while cutter teeth Kd and Ld finish the involute and perform cutting operations from the vicinity of the pitch diameter to the top of the teeth. It will be seen in the specific example shown in Fig. 13, that the number of teeth on the gear is equal to the number of teeth in each segment of the gear cutters.

Figure 15:
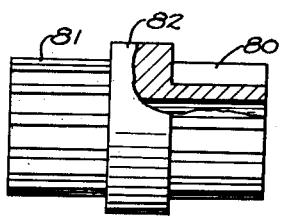
Fig. 15 is a view showing a form of gear which can be made.
Figure 16:
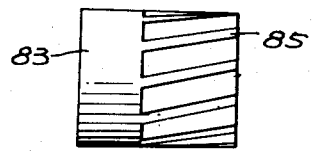
Fig. 16 is a view showing another form of gear which can be made with the present invention.
Figure 17:
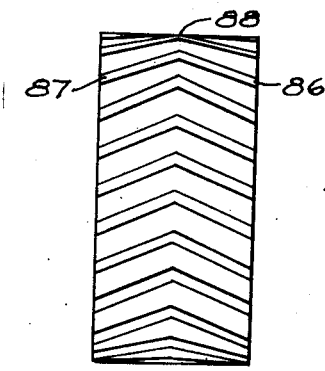
Fig. 17 is a view of a still further form of gear which can be made in accordance with the invention.

In addition to a shouldered cut gear, of the type illustrated in Fig. 12, other gears can be made, some of which are illustrated in Figs. 15, 16 and 17. In Fig 15 for example, a gear with cut teeth formed from an integral piece of metal may be formed with a portion 80 with gear teeth, a portion 81 with gear teeth, and with an intermediate integral shoulder or enlarged portion 82. In Fig. 16, a gear is shown having a shoulder 83 with helical or angular teeth 85. A herringbone type of gear is shown in Fig. 17 where a series of teeth 86 meet a series of teeth 87 without an intervening groove or spacing. In forming the teeth 86, they may be cut up to the central line 88. Then in forming the teeth 87, they may be cut to the same central line.

I claim:

1. Rotary gear cutting means for cutting teeth on a rotating blank and adapted to cut the teeth on the blank as the blank and the cutting means are rotated synchronously in opposite directions and moved relative to each other axially, comprising, a plurality of rotary cutting elements each having cutter teeth and each of gear like form, said cutter teeth adapted to engage a radial face of the blank and to cut into the blank during continued relative rotation and relative axial movement, some of the cutter teeth of the cutting elements having an outermost edge which constitutes a cutting edge for cutting the trailing dedendum of a tooth on the blank as said cutting edge moves out of engagement with the blank, some of the cutter teeth of the cutting elements having a radially outwardly facing cutting edge for cutting the leading dedendum of a tooth of the blank as said last named cutting edge is moving into engagement with the blank, some of the cutter teeth of the cutting elements having a radially outwardly facing cutting edge for cutting the trailing addendum of a tooth on the blank as the last named cutting edge is moving into engagement with the blank, and some of the cutter teeth of the cutting elements having a hook shaped radially inwardly facing cutting edge for cutting the leading addendum of a tooth on the blank as said hook-shaped cutting edge is moving out of engagement with the blank.

2. Rotary gear cutting means for cutting teeth on a rotating blank and adapted to cut the teeth on the blank as the blank and the cutting means are rotated synchronously in opposite directions and moved relative to each other axially, comprising, a plurality of rotary cutting elements each having cutter teeth and each of gear like form, said cutter teeth adapted to engage a radial face of the blank and to cut into the blank during continued relative rotation and relative axial movement, the cutter teeth on the cutting elements each having a single cutting edge, some of the cutter teeth of the cutting elements having an outermost edge which constitutes a cutting edge for cutting the trailing dedendum of a tooth on the blank as said cutting edge moves out of engagement with the blank, some of the cutter teeth of the cutting elements having a radially outwardly facing cutting edge for cutting the leading dedendum of a tooth of the blank as said last named cutting edge is moving into engagement with the blank, some of the cutter teeth of the cutting elements having a radially outwardly facing cutting edge for cutting the trailing addendum of a tooth on the blank as the last named cutting edge is moving into engagement with the blank, and some of the cutter teeth of the cutting elements having a hook shaped radially inwardly facing cutting edge for cutting the leading addendum of a tooth on the blank as said hook-shaped cutting edge is moving out of engagement with the blank.

3. Rotary gear cutting means for cutting teeth on a rotating blank and adapted to cut the teeth on the blank as the blank and the cutting means are rotated synchronously in opposite directions and moved relative to each other axially, comprising, a plurality of rotary cutting elements each having cutter teeth and each of gear like form, said cutter teeth adapted to engage a radial face of the blank and to cut into the blank during continued relative rotation and relative axial movement, the cutter teeth on the cutting elements each having a single cutting edge, there being at least four different types of cutter teeth and respective cutting edges, one of the four types of cutter teeth having an outermost edge which constitutes a cutting edge for cutting the trailing dedendum of a tooth as it moves out of engagement with the blank, two of the four types of cutter teeth having outwardly facing cutting edges, one for cutting the leading dedendum of a tooth as it moves into engagement with the blank, one for cutting the trailing addendum of a tooth as it moves into engagement with the blank, the fourth type of cutter tooth having a hook-shaped radially inwardly facing cutting edge for cutting the leading addendum of a tooth as said hooked shaped cutting edge is moving out of engagement with the blank.

WALDEMAR E. PACE.

References Cited in the file of this patent

UNITED STATES PATENTS

| Number | Name | Date |
|---|---|---|
| 1,267,970 | Burgess | May 28, 1918 |
| 1,543,031 | Short | June 23, 1925 |
| 1,642,179 | Schurr | Sept. 13, 1927 |
| 1,820,409 | Trbojevich | Aug. 25, 1931 |

FOREIGN PATENTS

| Number | Country | Date |
|---|---|---|
| 399,602 | Great Britain | Oct. 12, 1933 |